United States Patent
Walsh

(10) Patent No.: US 11,434,973 B2
(45) Date of Patent: Sep. 6, 2022

(54) PASSIVE VARIABLE STIFFNESS DEVICE FOR VIBRATION ISOLATION

(71) Applicant: Ohio University, Athens, OH (US)

(72) Inventor: Kenneth K. Walsh, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 17/601,945

(22) PCT Filed: Apr. 10, 2020

(86) PCT No.: PCT/US2020/027841
§ 371 (c)(1),
(2) Date: Oct. 7, 2021

(87) PCT Pub. No.: WO2020/210755
PCT Pub. Date: Oct. 15, 2020

(65) Prior Publication Data
US 2022/0090646 A1    Mar. 24, 2022

Related U.S. Application Data

(60) Provisional application No. 62/832,092, filed on Apr. 10, 2019.

(51) Int. Cl.
| F16F 15/18 | (2006.01) |
| F16F 15/06 | (2006.01) |
| E04B 1/98 | (2006.01) |
| E04H 9/02 | (2006.01) |

(52) U.S. Cl.
CPC ............ *F16F 15/06* (2013.01); *E04B 1/98* (2013.01); *E04H 9/02* (2013.01); *F16F 2228/001* (2013.01); *F16F 2228/066* (2013.01); *F16F 2230/18* (2013.01)

(58) Field of Classification Search
CPC .. F16F 15/02; F16F 15/04; F16F 15/06; F16F 15/067; E04B 1/98
See application file for complete search history.

(56) References Cited

U.S. PATENT DOCUMENTS

| 5,823,307 A | 10/1998 | Schubert et al. |
| 2010/0030384 A1 | 2/2010 | Kraner et al. |
| 2013/0118098 A1 | 5/2013 | Constantinou et al. |
| 2014/0197299 A1* | 7/2014 | Oppenheimer ......... F16F 15/04 248/638 |
| 2016/0082603 A1 | 3/2016 | Schimmels et al. |

FOREIGN PATENT DOCUMENTS

WO    2017177231 A1    10/2017

* cited by examiner

Primary Examiner — Vishal R Sahni
(74) Attorney, Agent, or Firm — Standley Law Group LLP; Jeffrey S. Standley; Eric M. Gayan

(57) ABSTRACT

Described and shown are passive variable stiffness devices, which are of compact design and configured to produce a restoring force that varies optimally with the isolator displacement when subjected to vibration-inducing loading.

19 Claims, 11 Drawing Sheets

PASSIVE VARIABLE STIFFNESS DEVICE FOR VIBRATION ISOLATION

TECHNICAL FIELD

Exemplary embodiments of the general inventive concept are directed to a passive variable stiffness device that can provide for the effective vibration isolation of objects of interest.

BACKGROUND

Effective vibration isolation can be achieved using a passive variable stiffness device with restoring force characteristics that can be optimized for different ranges of isolator displacements to achieve a desired payload response. For example, effective horizontal seismic isolation of acceleration-sensitive equipment in buildings can be achieved using a passive variable stiffness device that has positive tangential stiffness over small and large displacements, and zero tangential stiffness in between. This results in a variable restoring force that ensures stability of the system under service loading, limits excessive displacements under extreme seismic loading, and allows for zero stiffness isolation at the design level earthquake. Zero stiffness isolation leads to smaller payload accelerations, smaller forces transmitted to the building floor, and provides effective isolation for a broad band of excitation frequencies, compared to a similar isolation system using a constant stiffness isolator.

While zero stiffness isolation has many benefits, it comes at the cost of increased isolator displacements, which must be accommodated within the isolation system as well as on the floor of the building where the system is installed. Furthermore, while it is often desired to install such isolation systems on higher floors of a building where free space is typically more readily available, doing so can lead to further increases in the isolator displacements, as amplification of the horizontal ground motion to higher floors of a building can result in floor accelerations that are several times larger than those at ground level. Designing a passive variable stiffness device to accommodate large isolator displacements can lead to large devices that occupy significant floor space, depending on the configuration of the device. Therefore, a variable stiffness device that is compact, but can accommodate large isolator displacements, is desirable.

Although the above example is specific to horizontal vibration isolation of seismically-excited equipment, a passive variable stiffness device that can be designed to produce a restoring force that varies optimally with the isolator displacement, within a compact design, is generally desirable with respect to most passive vibration isolation applications.

SUMMARY

Exemplary embodiments of the general inventive concept present passive variable stiffness devices that include the aforementioned desirable characteristics. Improved exemplary passive variable stiffness device designs are presented in more detail below, along with the results of associated numerical simulations based on mathematical modeling that demonstrates the variability of the restoring force with the device displacements. As will be understandable to one of skill in the art, an exemplary passive variable stiffness device overcomes the limitations associated with traditional passive, semi-active, and active variable stiffness damping systems.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
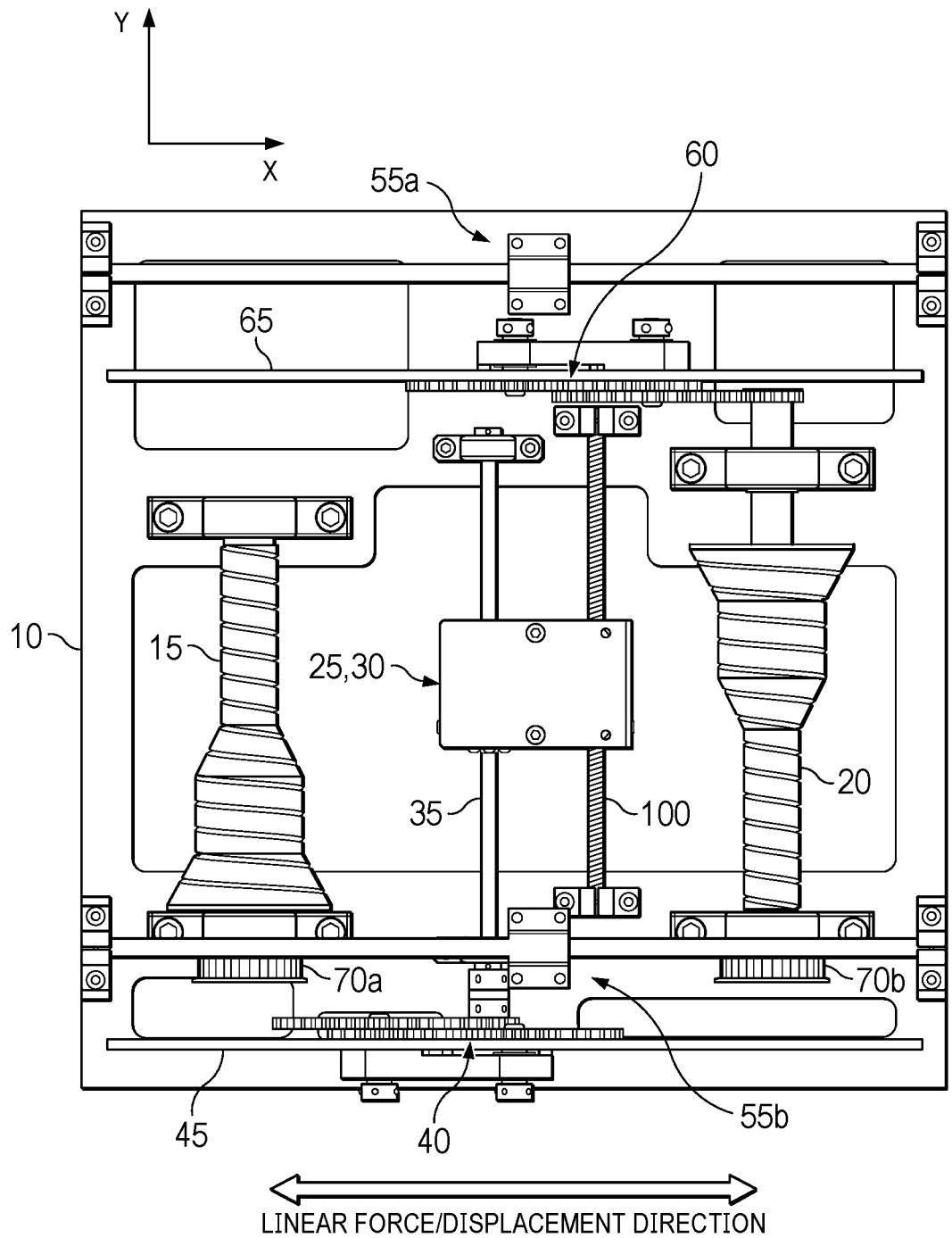
FIG. 1 is a plan view of one exemplary embodiment of a passive variable stiffness device.
Figure 2:
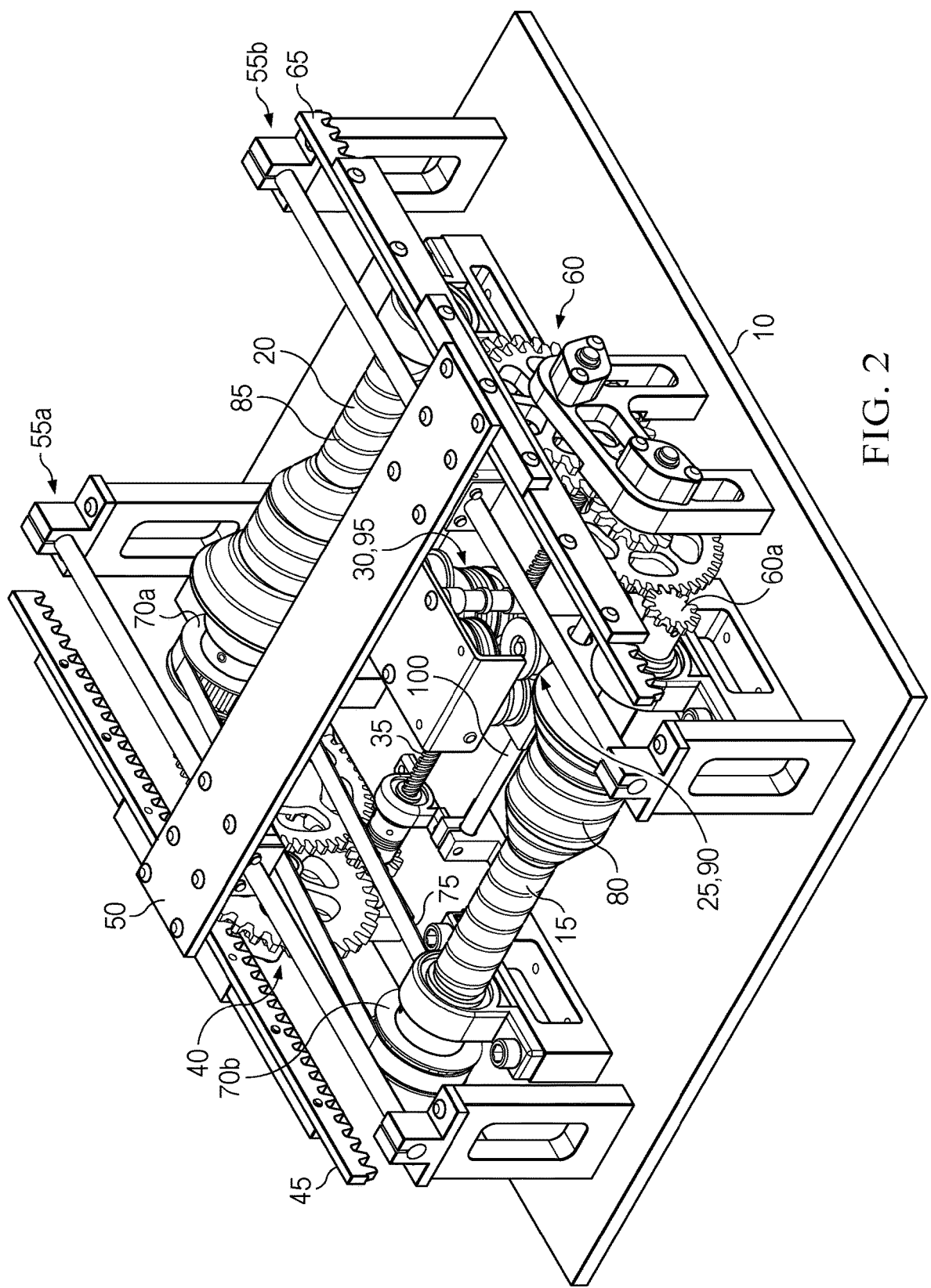
FIG. 2 is a perspective view of the exemplary device of FIG. 1.

One exemplary embodiment of a passive variable stiffness device 5 (hereinafter also just "device" for brevity) is represented in FIGS. 1-2. The exemplary device includes a number of components, such as a base plate 10 to which a number of other device components may be directly or indirectly mounted; an identical pair of spaced apart variable diameter cylinders 15, 20; an assembly of two constant force springs 25, 30 that resides in the space between the variable diameter cylinders 15, 20; a lead screw 35 and associated lead screw gear train 40 that imparts linear motion to the constant force spring assembly; a top plate 50 (see FIG. 2) and an associated pair of spaced apart top plate linear guide assemblies 55a, 55b; a cylinder gear train 60 that is driven by a corresponding cylinder gear rack 65 that is coupled to the top plate 50; a lead screw gear rack 45 that is also coupled to the top plate 50 and drives the lead screw gear train 40; and a pair of pulleys 70a, 70b that are coupled to respective ones of the variable diameter cylinders 15, 20 and are coupled to one another by a drive belt 75 (see FIG. 2).

One or more other components may also be present, such as but not limited to, other components used to convert between rotational and translational motion, and torque and force, within the device 5. A reference X-Y coordinate system is shown in FIG. 1 for facilitating an understanding of any subsequently described device component orientation and/or motion.

The diameter of each of the variable diameter cylinders 15, 20 (hereinafter also just "cylinder" individually or "cylinders" collectively for brevity) is constant over a portion of its length and variable over the remaining portion of its length. In the case of the variable diameter cylinders 15, 20 of this exemplary embodiment half of the length of each cylinder is of constant diameter and the remaining half of the length of each cylinder is of varying in diameter.

The variable diameter cylinders 15, 20 are aligned so that the longitudinal axes thereof are parallel to the Y-axis, and also substantially parallel to the direction of linear movement of the springs 25, 30 and substantially perpendicular to the direction of movement of the top plate 50. The variable diameter cylinders 15, 20 are also arranged in a flipped relationship such that the variable diameter end of one the first cylinder 15 faces the lead screw gear train 40 while the variable diameter end of other the second cylinder 20 faces the cylinder gear train 60.

The arrangement of the variable diameter cylinders 15, 20 also results in the constant diameter portion of the first the first cylinder 15 being located substantially across from the variable diameter portion of the second the second cylinder 20, and vice versa. This arrangement further results in point of diameter transition on each cylinder (i.e., the midpoint in this example) residing at the same position along the Y-axis of the device 5.

Each of the variable diameter cylinders 15, 20 is mounted to the base plate 10 so as to be restrained against linear movement and to be constrained to rotation about only the longitudinal axis thereof. Each of the variable diameter cylinders 15, 20 further includes a circumferential helical groove 80, 85 that preferably spans the length of the cylinder.

The constant force springs 25, 30 located between the variable diameter cylinders 15, 20 are stacked one on top of the other in this device embodiment. The springs 25, 30 are further arranged so that the front of the first spring 25 faces the first variable diameter the first cylinder 15, while the front of the second spring 30 faces the second variable diameter the second cylinder 20.

A retractable cable 90, 95 (see FIG. 2) is associated with and may be extended from a front portion of each constant force spring 25, 30. The cable 90 extends from the first spring 25 and is wound around approximately half the length of the first variable diameter the first cylinder 15. The cable 95 extends from the second spring 30 and is wound around approximately half the length of the second variable diameter the second cylinder 20. The wound portions of the cables 90, 95 reside within the helical grooves 80, 85 of the respective variable diameter cylinders 15, 20.

The cables 90, 95 are wound around the respective variable diameter cylinders 15, 20 starting at the same end of each cylinder (same Y-axis position) and wind toward the center thereof. However, the cables 90, 95 are wound around the respective cylinders 15, 20 in opposite directions—i.e., in a clockwise direction relative to one cylinder and in a counterclockwise direction relative to the other cylinder. The ending positions of the springs after winding of the cables is the position where the cables intersect the cylinders at substantially the midpoint of the length thereof, which is also a point where the cylinder diameters are equal.

The assembly of the constant force springs 25, 30 is mounted on the lead screw 35, which is operative to move the spring assembly back-and-forth along the Y-axis of the device, which is also substantially parallel to the longitudinal axes of the variable diameter cylinders 15, 20. A constraint element, such as the linear shaft 100 shown, may be provided to prevent rotation of the spring assembly about the lead screw 35 and to further constrain movement of the spring assembly to the direction of the Y-axis.

As mentioned above, pulleys 70a, 70b are respectively coupled to substantially aligned ends of the variable diameter cylinders 15, 20 and are coupled to each other by a belt 75. The pulleys 70a, 70b are preferably of like diameter, such that the ratio of the angular displacements between the cylinders 15, 20 will be 1:1 when the cylinders are caused to be rotated by transmission of a rotating force thereto (as described in more detail below).

At the same end of the device 5 near which the belt 75 and pulleys 70a, 70b reside is the aforementioned lead screw gear train 40. Teeth of the lead screw gear train 40 are engaged with complimentary teeth of a superjacent lead screw gear rack 45, which itself is connected to the overlying top plate 50. The lead screw gear train 40 is also coupled to and rotates the lead screw 35 that moves the assembly of constant force springs 20, 25.

The aforementioned cylinder gear train 60 resides near the opposite side of the device 5. Teeth of the cylinder gear train 60 are engaged with complimentary teeth of a superjacent cylinder gear rack 65, which is also connected to the overlying top plate 50. The cylinder gear train 60 includes a cylinder gear 60a that is coupled to the first variable diameter cylinder 15. Consequently, operation of the cylinder gear train 60 results in a rotation of the first variable diameter the first cylinder 15.

The top plate 50 is preferably a rigid component and is mounted on the linear guide assemblies 55a, 55b that facilitate linear motion of the top plate. Movement of the top plate is constrained to linear motion along the X-axis of the device 5 due to the orientation of the lead screw gear rack 45 and cylinder gear rack 60, as well as the orientation of the linear guide assemblies 55a, 55b. As would be understood by one of skill in the art, the top plate 50 serves as the connection between the device 5 and equipment or some other object, etc., for which the application of vibration isolation is desired. The forces of acceleration experienced by the object connected to the top plate 50 are transferred thereby to the device 5, where they are countered and movement of the object is correspondingly reduced by the restoring force characteristics of the device 5. As would be understood by one of skill in the art, the shape, size, configuration, etc., of the top plate 50 may be different in other embodiments as dictated by the object to which it will be connected or otherwise.

In the exemplary device 5 described above and represented in FIGS. 1-2, the gear trains 40, 60 operate to control the rotation of the variable diameter cylinders 15, 20 relative to displacement of the top plate 50. The gear trains 40, 60 also operate to control the rotation of the variable diameter cylinders 15, 20 relative to rotation of the lead screw 35, which in turn, controls the position of the constant force springs 25, 30 relative to the position of the cables 90, 95 that are wound about the cylinders. The gear trains 40, 60 further serve to amplify the force imparted to the top plate 50 by the constant force springs 25, 30.

Top plate displacement—which is constrained to linear movement—is converted to rotation of the first variable diameter the first cylinder 15 when resulting linear motion of the cylinder gear rack 65 connected to the top plate 50 causes a resulting rotation of the cylinder gear train 60 with which the gear rack is engaged. The rotation of the first variable diameter cylinder 15 is then transferred to the second variable diameter the second cylinder 20 via the belt 75 and pulleys 70a, 70b.

The torque that develops about the second variable diameter cylinder 20 as a result of this rotation is transferred back to the first variable diameter cylinder via the combination of the belt 75 and pulleys 70a, 70b. The total torque on the first variable diameter the first cylinder 15, or the sum of the torques on the first and second variable diameter cylinders 15, 20, is then converted to a force on the top plate 50 through the cylinder gear rack 65 and associated cylinder gear train 60.

As described above, the assembly of the constant force springs 25, 30 is mounted on the lead screw 35, and rotation of the lead screw produces a linear movement of the constant force springs along the Y-axis direction of the device and parallel to the longitudinal axes of the variable diameter cylinders 15, 20 as the cables 90, 95 extending from the constant force springs wind/unwind about the cylinders. The lead screw 35 functions to keep the longitudinal axes of the cables 90, 95 substantially perpendicular to the longitudinal axes of the variable diameter cylinders 15, 20 at all times during operation of the device 5.

When the device 5 is in what may be referred to as the starting position, the constant force springs 25, 30 produce resistive torques on the variable diameter cylinders 15, 20 that are equal in magnitude but opposite in direction, resulting in static equilibrium of the device. However, linear movement of the top plate in the ±X-direction, such as movement caused by seismic activity when the device is installed in a given application, produces a clockwise rotation of one of the cylinders and a counterclockwise rotation of the other cylinder, as well as a winding of one of the cables and an unwinding of the other cable. That is, based on the arrangement of the variable diameter cylinders 15, 20, the cable on one cylinder will wind/unwind up the variable diameter, thereby increasing its resistive torque, while the cable on the other cylinder will wind/unwind along a constant diameter, and its resistive torque will remain constant.

During winding/unwinding of the cables 90, 95, the constant force springs 25, 30 are driven by the lead screw 35 in the direction of winding/unwinding (±Y-direction) to ensure that the cables remain within the helical grooves 80, 85 in the variable diameter cylinders 15, 20. The gear trains 40, 60 at each end of the device 5 are designed to ensure that the constant force springs 25, 30 are driven at the same rate at which the cables 90, 95 move along the cylinder lengths as they are wound/unwound.

The torques from both of the variable diameter cylinders 15, 20 are transmitted through the device 5 to the top plate 50, resulting in a net resistive force being exerted on the top plate in the ±X-direction. The net resistive force increases with increasing displacement of the top plate 50, with the rate of increase depending on the change in diameter of the variable diameter cylinders 15, 20. Consequently, an exemplary variable stiffness device may be provided with a wide range of force-displacement characteristics through the design of the variable diameter cylinders. Furthermore, an exemplary device can accommodate a large range of isolator displacements by increasing the length of the cables associated with the constant force springs and by increasing the number of times the cables are wrapped around the cylinders (e.g., by decreasing the spacing between the helical grooves), without requiring any significant increase in the size of the device.

The mathematical modeling of an exemplary variable stiffness device may be better understood by reference to FIGS. 3A-5 and the following cooperating description.

Figure 3A:
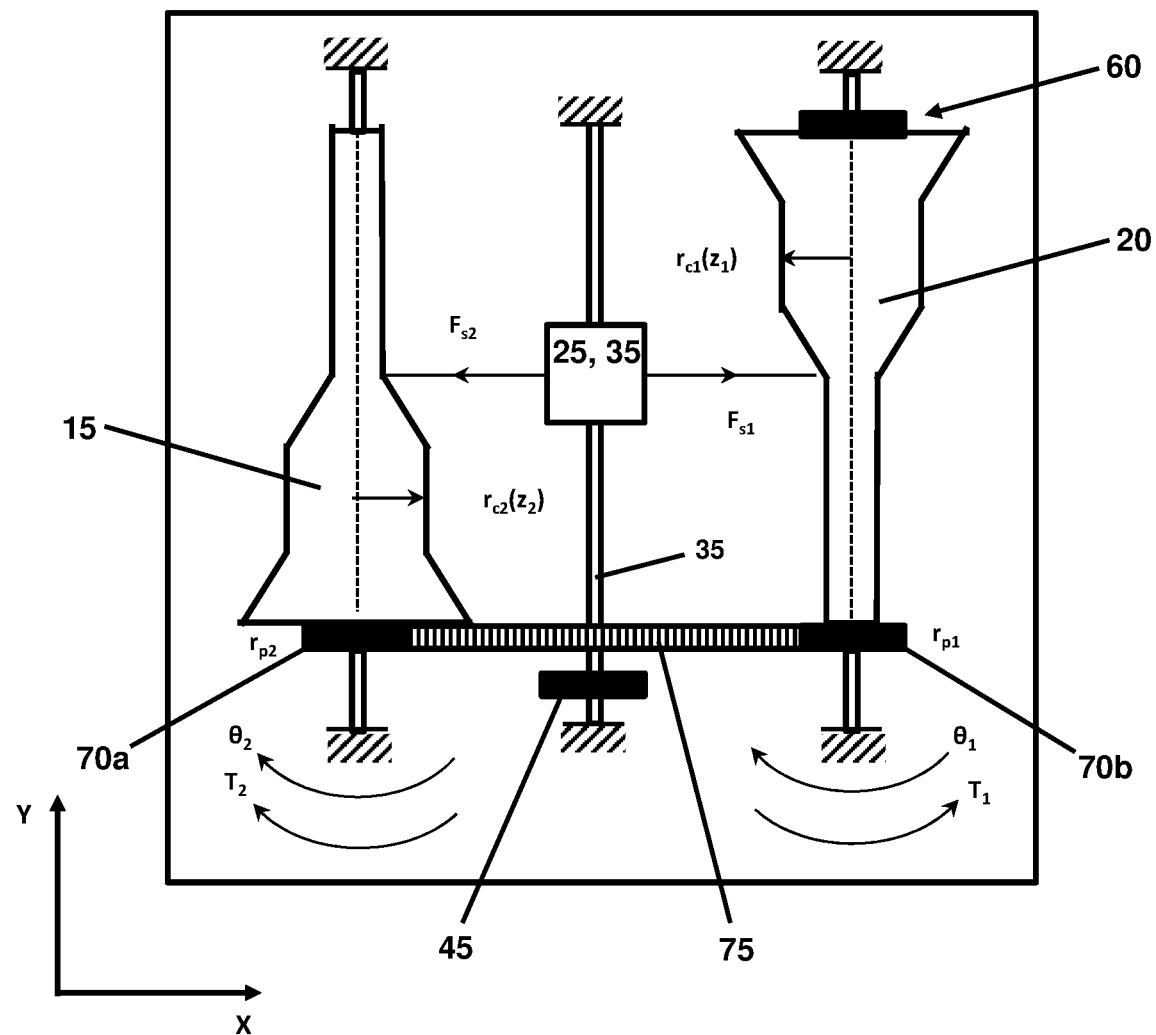
FIG. 3A is a schematic plan view representing an exemplary embodiment of a passive variable stiffness device, where certain components have been omitted for clarity.
Figure 3B:
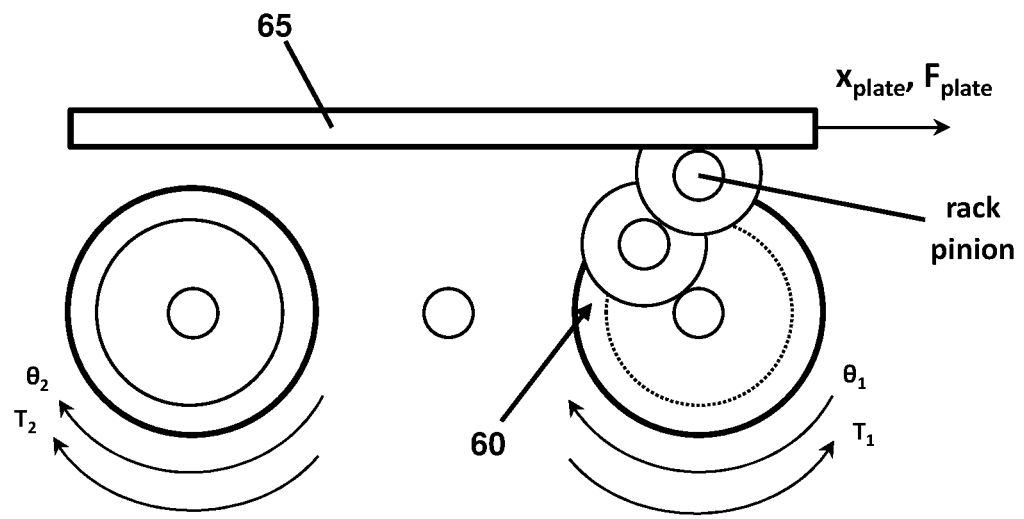
FIGS. 3B and 3C are schematic elevation views of the exemplary passive variable stiffness device of FIG. 3A.
Figure 3C:
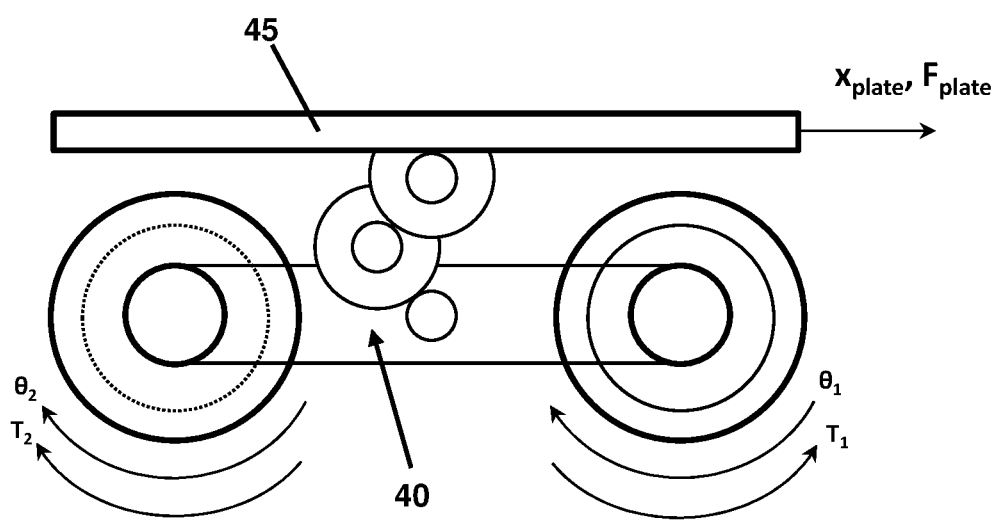

FIG. 3A is a schematic plan view of the exemplary passive variable stiffness device 5 of FIGS. 1-2, where various components not essential to modeling of device force-displacement characteristics (e.g., top plate, linear guides, etc.) have been omitted for clarity. Schematic elevation views of opposite sides of the device of FIG. 3A are respectively presented in FIGS. 3B and 3C, where various components not essential to modeling of device force-displacement characteristics have again been omitted for clarity.

The total force exerted on the top plate (50) of the device is the sum of the forces exerted by the cylinder gear rack (60) and the lead screw rack (45), which are both connected to the bottom of the top plate, or:

$$F_{plate} = F_{cyl} + F_{scr} \quad (1)$$

In Equation 1, the force $F_{cyl}$ exerted by the cylinder gear rack is designed to vary with the displacement of the top plate and is, therefore, the primary force of interest in the device. Meanwhile, the force $F_{scr}$ exerted by the lead screw gear rack is a secondary force generated by driving the constant force springs 25, 35 along the lead screw 35. The force $F_{scr}$ should be designed to be small relative to $F_{cyl}$, and will therefore have little significance on the operation of the device. As a result, only the force $F_{cyl}$ will be considered hereafter. The force $F_{cyl}$ exerted by the cylinder gear rack on the top plate is equal to the torque $T_{pin}$ generated about the pinion connected to the cylinder gear rack divided by the radius $r_{pin}$ of the pinion, or:

$$F_{cyl} = \frac{T_{pin}}{r_{pin}} \quad (2)$$

The torque $T_{pin}$ is the product of the total gear ratio f of the cylinder gear train and the total torque $T_{total}$ generated on the first variable diameter cylinder 15, or:

$$T_{pin} = f \cdot T_{total} \quad (3)$$

where the total gear ratio f of the cylinder gear train is the product of the gear ratios of the individual gear pairs comprising the gear train. The total torque $T_{total}$ generated on the first cylinder is the sum of the torque $T_1$ generated about the first cylinder and the torque $T_2$ generated about the second cylinder and transferred to the first cylinder through the belt-pulley system (70a, 70b, 75).

The torque $T_1$ generated about the first cylinder is equal to the product of the force $F_{s1}$ from the constant force spring connected to the first cylinder and the radius $r_{c1}(z_1)$. The radius $r_{c1}(z_1)$ is the radius of the helical groove around the circumference of the first cylinder within which the cable from the associated constant force spring resides when wound around the first cylinder. The radius of the helical groove varies with the cylinder radius as a function of the position $z_1$ of the helical groove along the longitudinal axis of the first cylinder. The torque $T_1$ is given by:

$$T_1 = F_{s1} \cdot r_{c1}(z_1) \quad (4)$$

Similarly, the torque $T_2$ generated about the second cylinder is equal to the product of the force $F_{s2}$ from the constant force spring connected to the second cylinder by the associated cable and the radius $r_{c2}(z_2)$ of the helical groove around the circumference of the second cylinder within which the cable from the associated constant force spring resides when wound around the second cylinder, or:

$$T_2 = F_{s2} \cdot r_{c2}(z_2) \qquad (5)$$

The two variable diameter cylinders are connected by the belt-pulley system so that the torque $T_2$ is transferred to the first cylinder, or:

$$T_{12} = \frac{r_{p1}}{r_{p2}} T_2 \qquad (6)$$

where $r_{p1}$ is the radius of the pulley attached to the first cylinder, $r_{p2}$ is the radius of the pulley attached to the second cylinder, and $T_{12}$ is the torque transferred to the first cylinder from the second cylinder through the belt-pulley system. The total torque about the first cylinder is then equal to:

$$T_{total} = T_1 + T_{12} = F_{s1} \cdot r_{c1}(z_1) + \frac{r_{p1}}{r_{p2}} \cdot F_{s2} \cdot r_{c2}(z_2) \qquad (7)$$

Combining Equations 1-7 results in the following mathematical formula for determining the force on the top plate:

$$F_{plate} = \frac{f}{r_{pin}} \cdot \left[ F_{s1} \cdot r_{c1}(z_1) + \frac{r_{p1}}{r_{p2}} \cdot F_{s2} \cdot r_{c2}(z_2) \right] \qquad (8)$$

Figure 4:
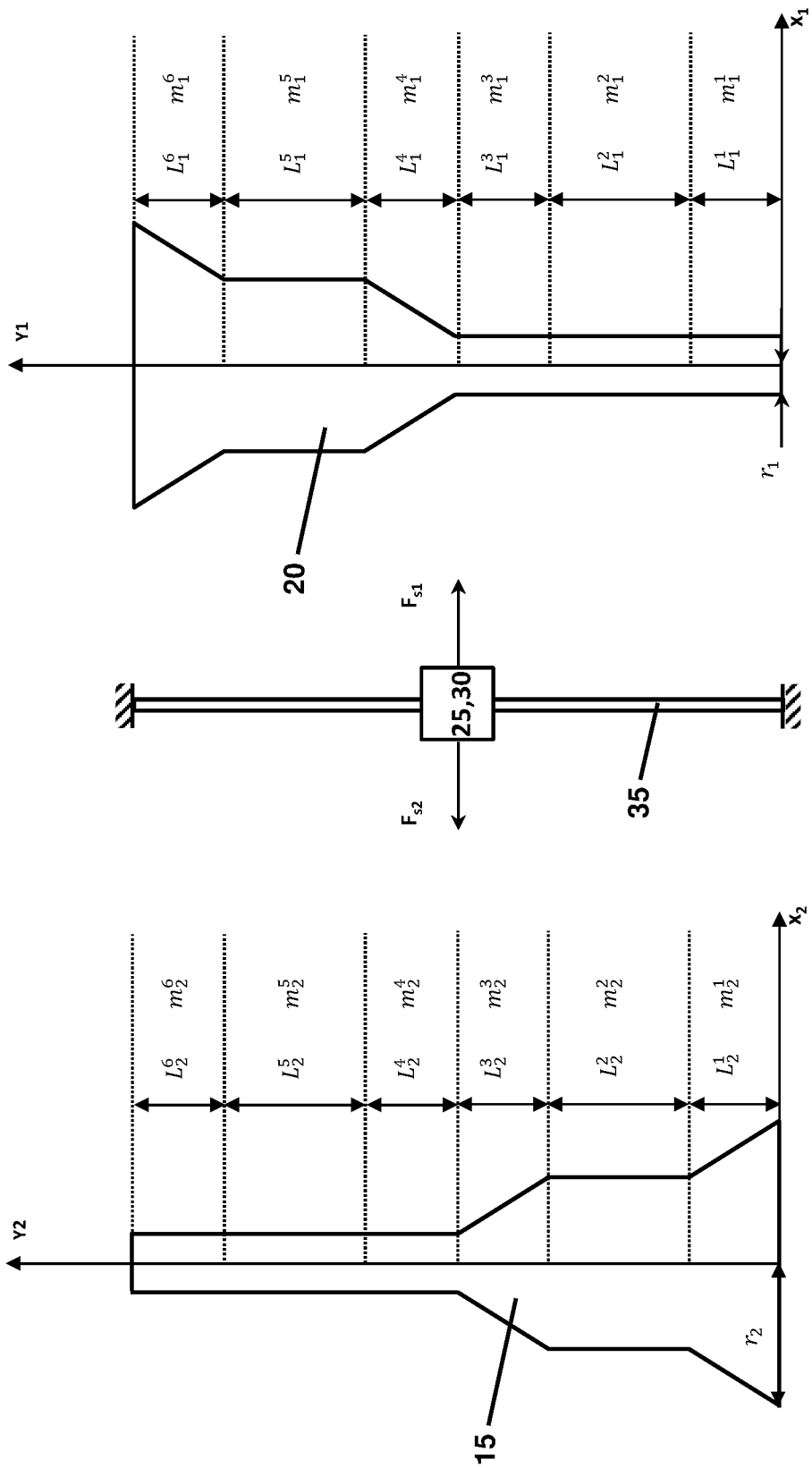
FIG. 4 is a schematic plan view illustrating variable diameter cylinders for use in an exemplary embodiment of a passive variable stiffness device.

Equation 8 shows that the force on the top plate depends on the radii $r_{c1}(z_1)$ and $r_{c2}(z_2)$ of the helical grooves around the circumferences of the variable diameter cylinders about which the cables from the corresponding constant force springs are wound. Therefore, in order to describe the force on the top plate for any position z of the cables along the length of the cylinders, it is necessary to define the variation in the radii of the helical grooves along the cylinder lengths. To this end, a schematic representation of the variable diameter cylinders 15, 20 is shown in FIG. 4. The cylinders are drawn with the same arrangement and orientation shown in FIGS. 1-2. The assembly of the constant force springs 25, 30 is again shown to reside between the cylinders 15, 20 and to be coupled to the lead screw 35.

It can be seen from FIG. 4 that the cylinders 15, 20 have been divided into n sections with the lengths of the $i^{th}$ section of the first cylinder and the second cylinder denoted as $L_1^i$ and $L_2^i$, respectively. Furthermore, each section of the cylinders has a constant slope that defines the change in radius of the cylinder over the length of the section. The slopes of the $i^{th}$ section of the first cylinder and the second cylinder are denoted as $m_1^i$ and $m_2^i$, respectively, and will be positive if the radius increases with increasing position along the Y-axis. Finally, the starting radii $r_1$ and $r_2$ of the first section of the first cylinder and the second cylinder are also included in the figure. The section lengths, slopes, and starting radii can now be used to define the radii of the helical grooves along the circumference of the $i^{th}$ section of the first cylinder and the second cylinder as:

$$r_{c1}^i(z_1) = \left(r_1 + \sum_1^i m_1^{i-1} \cdot L_1^{i-1}\right) + \left(z_1 - \sum_1^i L_1^{i-1}\right) \cdot m_1^i \qquad (9)$$

and $$r_{c2}^i(z_2) = \left(r_2 + \sum_1^i m_2^{i-1} \cdot L_2^{i-1}\right) + \left(z_2 - \sum_1^i L_2^{i-1}\right) \cdot m_2^i \qquad (10)$$

Equations (9) and (10) can be expressed more generally as:

$$r_{c1,2}^j(z_{1,2}) = \qquad (11)$$
$$\left(r_{1,2} + \sum_1^j m_{1,2}^{i-1} \cdot L_{1,2}^{i-1}\right) + \left(z_{1,2} - \sum_1^j L_{1,2}^{i-1}\right) \cdot m_{1,2}^i \quad m_{1,2}^0 = L_{1,2}^0 = 0$$

where the subscripts 1 and 2 denote the first cylinder or the second cylinder. Equation 11 defines the radii of the helical grooves in first cylinder and the second cylinder as functions of the positions $z_1$ and $z_2$ of the helical grooves along the longitudinal axes of the cylinders, respectively.

The positions $z_{1,2}$, in turn, are related to the leads $l_{1,2}$ of the helical grooves and the number of rotations $\theta_{1,2}$ of the cylinders, or:

$$z_{1,2} = l_{1,2} \cdot \frac{\theta_{1,2}}{2 \cdot \pi} \qquad (12)$$

In Equation 12, the rotation $\theta_2$ of the second cylinder is related to the rotation $\theta_1$ of the first cylinder by the belt-pulley system, or:

$$\theta_2 = \frac{r_{p1}}{r_{p2}} \theta_1 \qquad (13)$$

Furthermore, the rotation $\theta_1$ of the first cylinder is related to the rotation $\theta_{pin}$ of the pinion connecting the cylinder gear train to the cylinder rack, or:

$$\theta_1 = f \cdot \theta_{pin} \qquad (14)$$

and the rotation $\theta_{pin}$ is related to the top plate displacement $x_{plate}$ by:

$$\theta_{pin} = \frac{x_{plate}}{r_{pin}} \qquad (15)$$

Considering that the device is designed so that the constant force springs have the same spring force ($F_{s1}=F_{s2}=F_s$), the torques $T_1$ and $T_2$ always oppose each other the cables extending from the constant force springs are constrained to have the same position along the axes of the cylinders ($z_1=z_2=z$) the leads of the helical grooves around the circumference of the cylinders are the same ($l_1=l_2=l$), the length of the cylinder sections are the same ($L_1^i=L_2^i=L^i$), and the radius of the pulleys in the belt-pulley system are equal ($r_{p1}=r_{p2}$), Equations 8-15 can be combined to give the force on the top plate $F_{plate}$ as a function of the top plate displacement $x_{plate}$, or:

$$F_{plate} = \frac{f \cdot F_s}{r_{pin}} \cdot \left[ (r_1 - r_2) + \left( \sum_1^i (m_1^{i-1} - m_2^{i-1}) \cdot L^{i-1} \right) + \left( \frac{L}{2} - \sum_1^i L^{i-1} \right) \cdot (m_1^i - m_2^i) \right] + \frac{f^2 \cdot F_s \cdot l}{2 \cdot \pi \cdot r_{pin}^2} \cdot (m_1^i - m_2^i) \cdot x_{plate} \quad (16)$$

In Eq. 16, the following transformation was used to relate the position $u_{cable}$ of the cable in the helical groove and the position z of the helical groove along the length of the cylinder:

$$z = u_{cable} + \frac{L}{2}, \quad (17)$$

and the position $u_{cable}$ is related to the position $x_{plate}$ of the top plate by:

$$u_{cable} = \frac{f \cdot l}{2 \cdot \pi \cdot r_{pin}} x_{plate} \quad (18)$$

Figure 5:
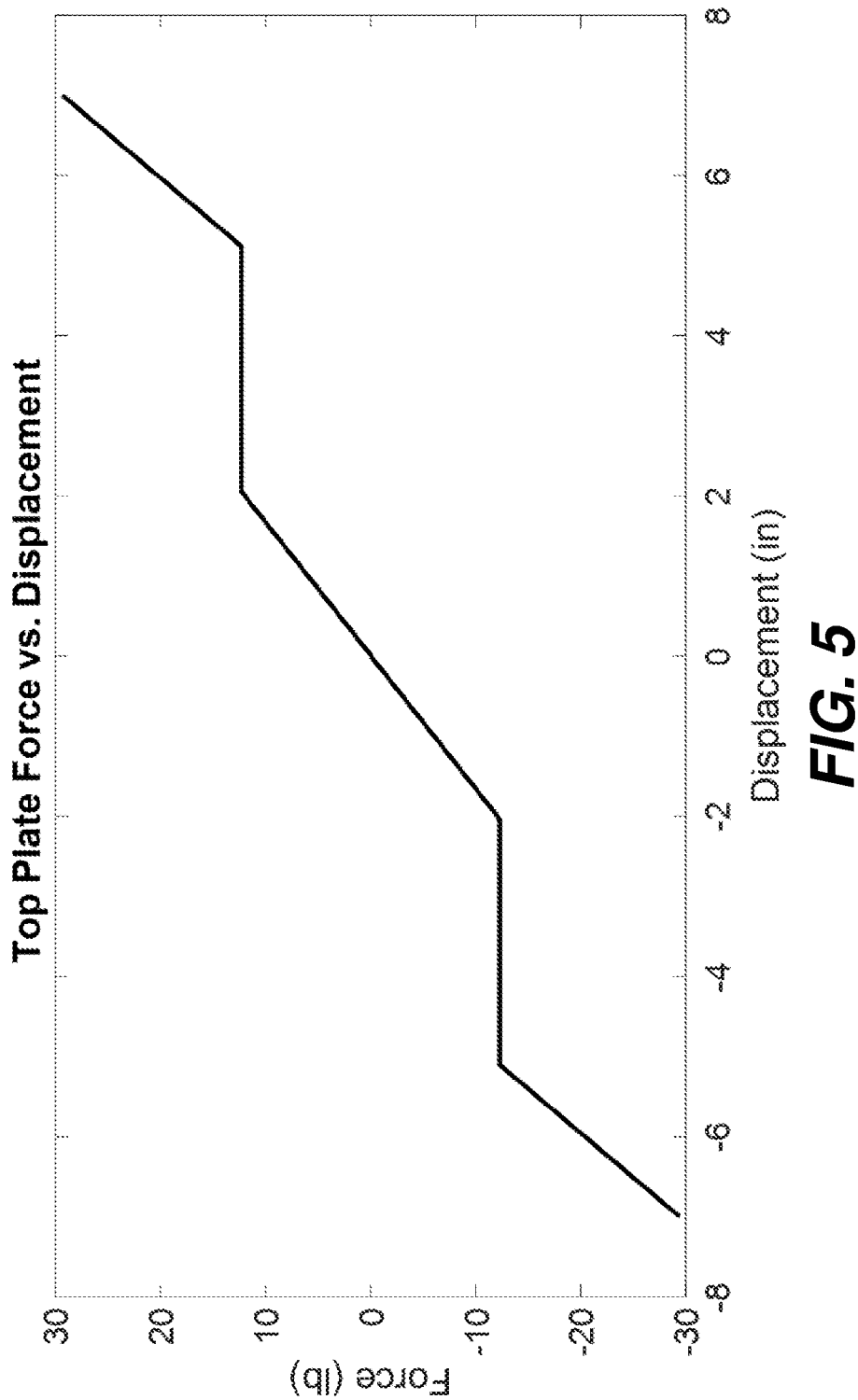
FIG. 5 graphically represents top plate force versus displacement for an exemplary embodiment of a passive variable stiffness device.

A plot of the top plate force vs. displacement for an example passive variable stiffness system is shown in FIG. 5, where the variable force-displacement characteristics of the device can be observed. The force-displacement profile of the device shown in FIG. 5 is characterized by positive tangential stiffness at small and large positive and negative displacements, and zero tangential stiffness in between. The force-displacement profile of the device is directly related to slopes of the different sections chosen for the variable diameter cylinders. As a result, various force-displacement profiles are achievable by manufacturing properly shaped variable diameter cylinders.

Figure 6A:
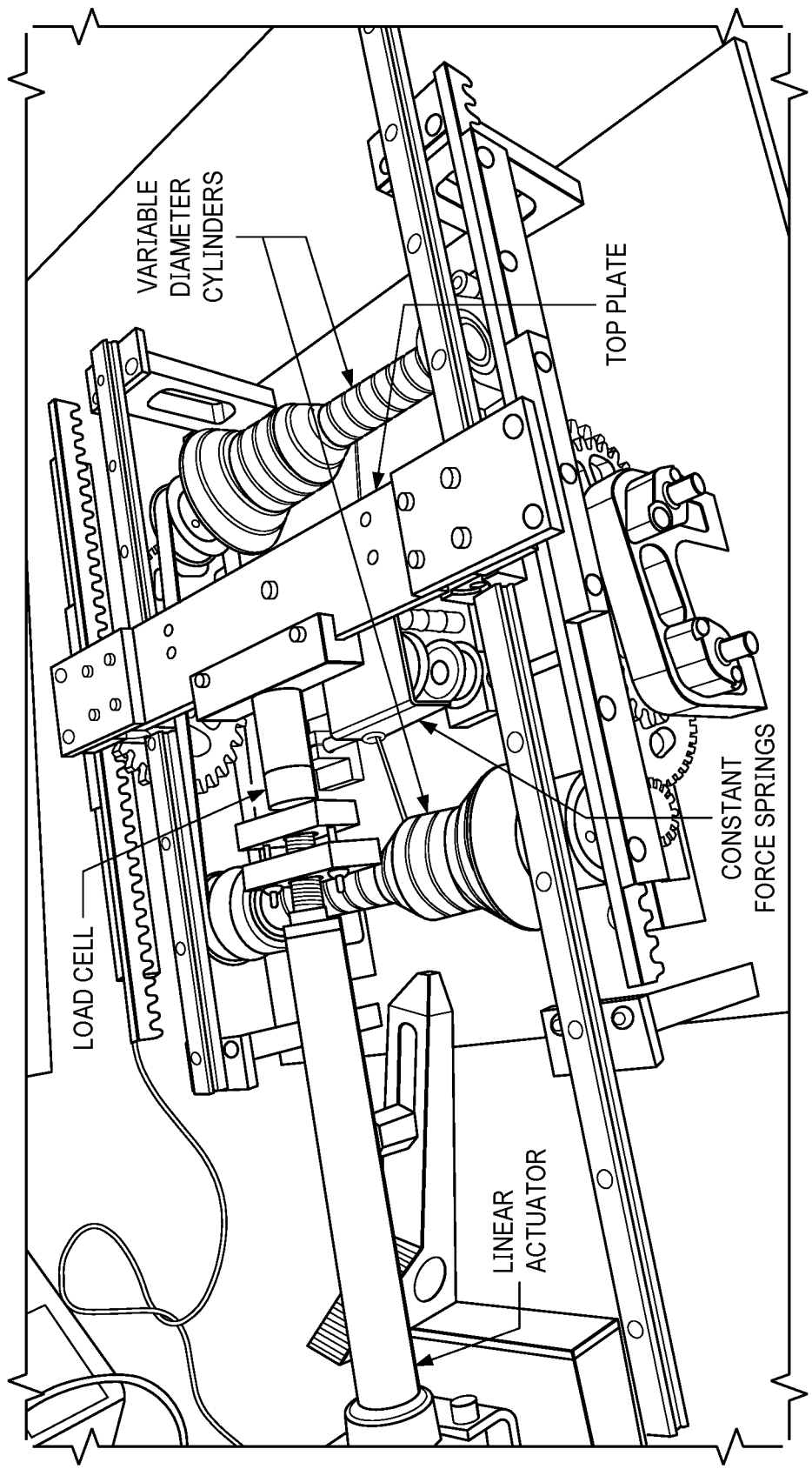
FIGS. 6A-6C depict a prototype of one exemplary passive variable stiffness device, via which motion of the various components thereof may be better understood.
Figure 6B:
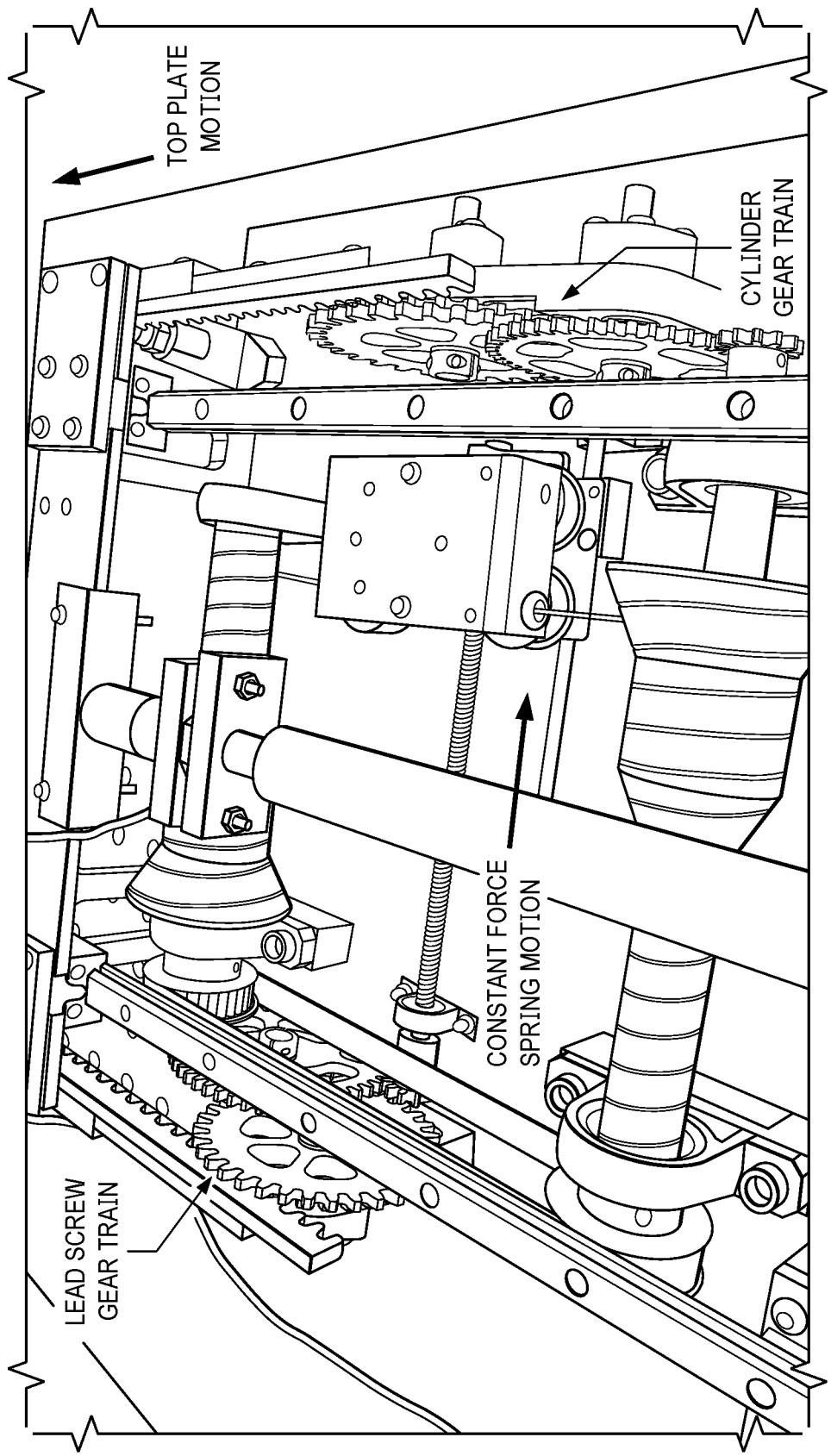
Figure 6C:
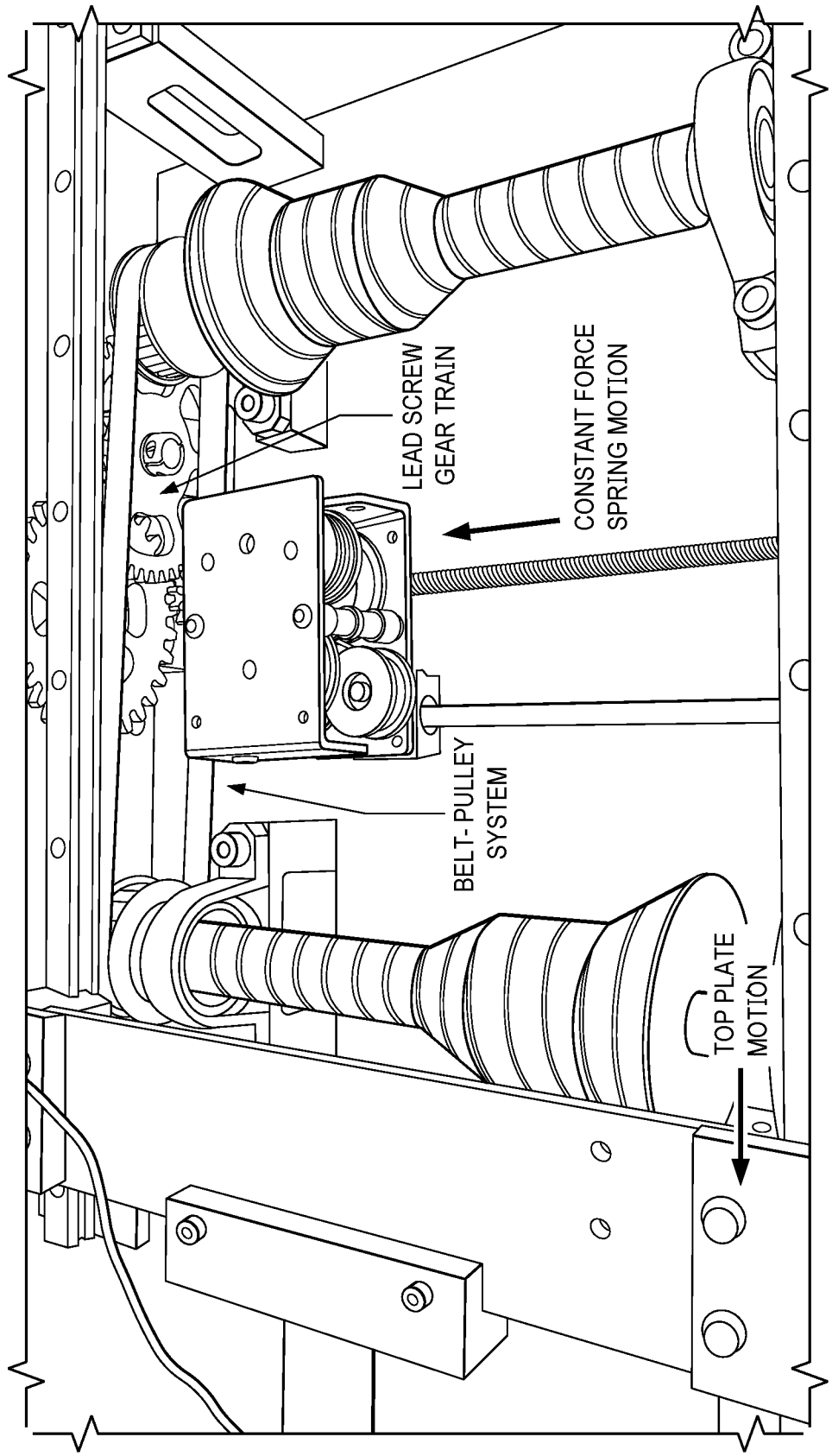

In order to validate the general inventive concept, a prototype device was fabricated and tested. The test setup is shown in FIGS. 6A-6C, where components of the passive variable stiffness device such as the variable diameter cylinders, constant force springs, cylinder gear train, lead screw gear train, and the belt-pulley system are labeled for clarity. Testing of the prototype passive variable stiffness device consisted of rigidly attaching the base plate of the device to a fixed table-top. The top plate of the device was fitted with an adapter that was affixed to a load cell capable of measuring tension and compression forces. The opposite side of the load cell was connected to a linear electro-mechanical actuator that was used to drive the top plate with sinusoidal motion. FIGS. 6B and 6C show the relationship between the motion of the top plate and the motion of the constant force springs.

Figure 7:
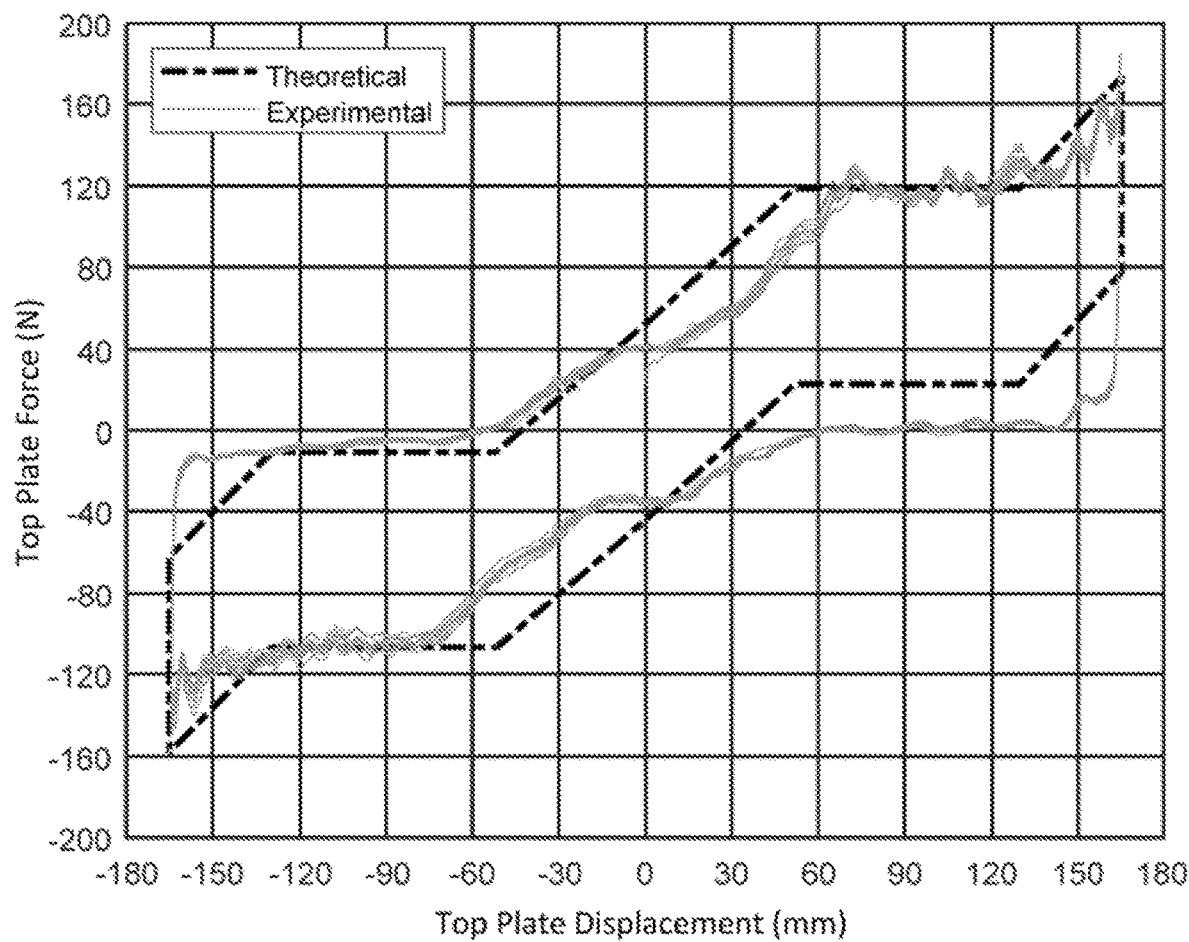
FIG. 7 graphically represents experimental top plate force versus theoretical top plate force for an exemplary embodiment of a passive variable stiffness device.

The force from the load cell and the position of the actuator were collected using a DAQ system with a sampling rate of 20 Hz. The force and position data were used to evaluate the variable force-displacement characteristics of the prototype device. A plot of the experimental top plate force versus displacement is shown in FIG. 7, along with the theoretical force versus displacement predicted from Equation 16. It should be noted that the theoretical prediction includes and additional Coulomb friction term to account for the friction inherent in the experiment.

Comparison of the experimental and theoretical force-displacement plots shows generally good agreement. Furthermore, the experimental force-displacement profile demonstrates that the prototype device was working as intended. That is, the device exhibited variable force-displacement characteristics and produced positive tangential stiffness at small and large positive and negative displacements, and zero tangential stiffness in between. The difference in the loading and unloading curves gives a 'banded' appearance to the force-displacement profile and is due to friction in the components of the device.

Figure 8:
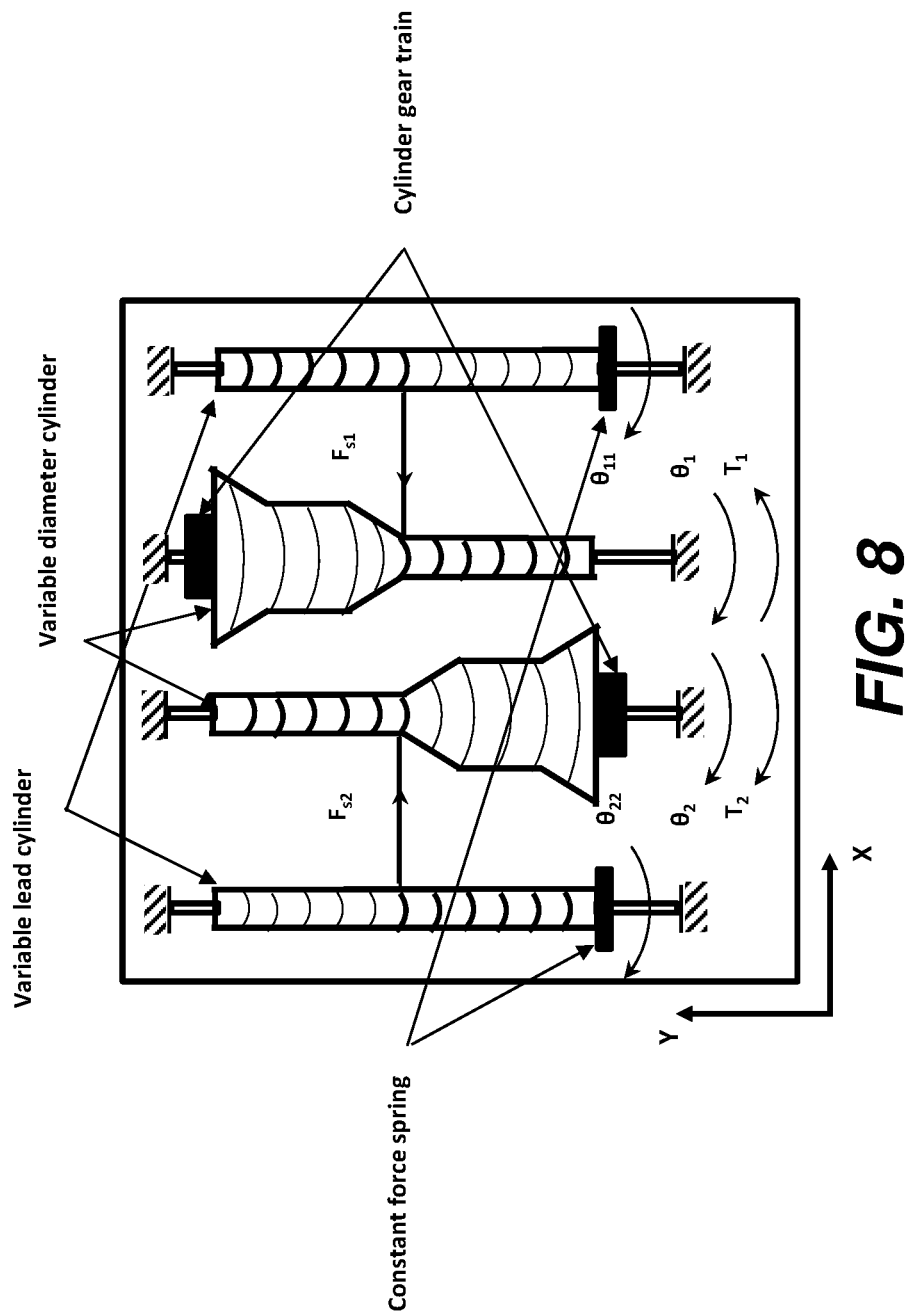
FIG. 8 is a schematic plan view representing an alternative exemplary embodiment of a passive variable stiffness device, where certain components have again been omitted for clarity.

One alternative embodiment of a passive variable stiffness device, where the lead screw of the previously described exemplary embodiments has been removed and replaced with another mechanism for keeping the longitudinal axes of the cables extending from the constant force springs perpendicular to the longitudinal axes of the variable diameter cylinders, is shown in FIG. 8. In this exemplary embodiment, the lead screw has, more specifically, been replaced with two constant diameter cylinders with variable lead helical grooves encircling their circumferences.

In such an embodiment, each variable lead cylinder is paired with one of the variable diameter cylinders, as shown. Each pair of variable diameter cylinder and variable lead cylinder are arranged so that their longitudinal axes are parallel. Each variable diameter cylinder is then connected to the top plate using a rack-and-pinion (or back-driven ball-screw) with or without a gear train (gear train shown in FIG. 8) to convert horizontal linear displacement of the top plate to rotation of the cylinders.

In the exemplary passive variable stiffness device embodiment of FIG. 8, the belt-pulley system has also been omitted and each cylinder is connected directly to the gear rack. However, the belt-pulley system could also be used as shown and explained relative to the previously described exemplary embodiments.

In the alternative device embodiment of FIG. 8, each variable lead cylinder has a constant force spring attached to one end thereof. Cables associated with the constant force springs are initially wound around half of the variable lead cylinders and half of the variable diameter cylinders, starting from opposite ends of the cylinders. This winding technique is represented in FIG. 8 by the use of thin lines to represent the helical grooves around the circumference of the cylinders and the use of thicker lines to represent cables that have been wound about the cylinders and are residing in some of the helical grooves.

The cables are again wound in opposite directions about the cylinders resulting in opposing torques on the variable diameter cylinders. The cables are wound around the cylinders until they reach the transition point of the variable diameter cylinders—i.e., the point at which the change from a constant diameter to a variable diameter occurs but where the diameters of the variable diameter cylinders are the same. As a result, the initial torques on the variable diameter cylinders are equal in magnitude but opposite in direction, resulting in static equilibrium of the passive variable stiffness device at the starting position.

When the variable diameter cylinders are driven by the top plate, the cables extending from the constant force springs wind/unwind along the cylinder pairs. In a manner similar to that of the previously described exemplary device embodiments, the cable from one cylinder pair winds/unwinds along the length of the variable diameter cylinder with increasing diameter, leading to an increase in the resistive torque on that variable diameter cylinder. Meanwhile, the cable from the other cylinder pair winds/unwinds along the length of variable diameter cylinder with constant diameter, leading to a constant resistive torque on that variable diameter cylinder. The torques on the variable diameter cylinders are transferred as forces to the top plate resulting in a net resistive force on the top plate that increases with increasing displacement of the top plate.

In the alternative passive variable stiffness device embodiment of FIG. 8, a variable lead cylinder with an attached constant force spring is paired with each variable diameter cylinder to produce a net resistive force on the top plate that varies with the top plate displacement. As previously described, the cables extending from the constant force springs are initially wound around half of the length of both cylinders in each cylinder pair until they reach the transition point of the variable diameter cylinders. As the top plate drives the variable diameter cylinders, the rotation of the variable diameter cylinders will cause rotation of the variable lead cylinders through the tension in the cables of the constant force springs. That is, the cable from the constant force springs constrains the variable diameter cylinders and the variable lead cylinders to have the same circumferential displacement and velocity.

When the cable is wound/unwound about the lengths of the cylinders in each pair with the same diameter, the rotation of the variable diameter cylinder and the variable lead cylinder will be the same. However, when the cable is wound/unwound about the lengths of the cylinders in each pair with different diameters, the rotation of the variable diameter cylinder and the variable lead cylinder will be different. Specifically, the cylinder in the pair with the smaller diameter will have higher angular displacement and velocity (i.e., will rotate more) relative to the cylinder with the larger diameter. If the cylinders have helical grooves with the same lead, the difference in the angular displacements of the two cylinders will result in the cable moving further along the longitudinal axis of the cylinder with the smaller diameter relative to the cylinder with the larger diameter.

When this happens, the angle between the longitudinal axes of the cables extending from the constant force springs and the longitudinal axes of the cylinders in each cylinder pair will no longer be perpendicular, and the cables could slip out of the helical grooves. Therefore, to ensure that the longitudinal axes of the cables from the constant force springs remain perpendicular to the longitudinal axes of the cylinders in each pair, it is necessary for the variable lead cylinders to have helical grooves with different leads along their lengths. Specifically, where the diameter of the variable lead cylinder is smaller than that of the variable diameter cylinder, the helical groove on the variable lead cylinder should have a shorter lead. Where the diameter of the variable lead cylinder is larger than that of the variable diameter cylinder, the helical groove on the variable lead cylinder should have a longer lead.

At least some of the exemplary passive variable stiffness device embodiments described above and represented in the drawing figures include several common mechanical components/assemblies, such as rack-and-pinion assemblies, gear trains, a belt-pulley system, and a lead screw. However, it is realized that exemplary passive variable stiffness devices may be configured differently while still achieving the same variable force-displacement characteristics. For example, and without limitation, the aforementioned rack-and-pinion mechanisms could be replaced by a back-driven ball screw while still maintaining the same functionality of the device. Alternatively, depending on the design of the variable diameter cylinders, lead screw and constant force springs used, it may be possible to eliminate one, or both, gears trains in an alternative passive variable stiffness device embodiment. As another example, instead of using the top plate to drive the first variable diameter cylinder via a belt-pulley system as explained and shown relative to the already described exemplary device embodiments, the top plate could instead drive each variable diameter cylinder independently using separate rack-and-pinions (or back-driven ball-screws) with or without gear trains in an alternative embodiment.

According to yet another alternative design, the cables associated with the constant force springs could be wound in the opposite direction around the variable diameter cylinders so that the resulting torque assists, instead of resists, the motion of the top plate. In this case, the device would produce force-displacement characteristics with a negative slope, or passive variable negative stiffness. Still further, variable diameter cylinders with sections of constant slope could instead be designed with other variations in diameter to produce the desired variable force-displacement characteristics.

What is claimed is:

1. A passive variable stiffness device, comprising:
   a base plate;
   a pair of parallel variable diameter cylinders having first ends and second ends, each variable diameter cylinder mounted to the base plate so as to be restrained against linear movement and constrained to allow rotation only about its longitudinal axis;
   a linearly displaceable but rotationally restrained spring assembly comprising a pair of constant force springs located in a space between the variable diameter cylinders;
   a lead screw extending parallel to the longitudinal axes of the variable diameter cylinders, the lead screw coupled to the spring assembly such that rotation of the lead screw will produce a linear displacement of the spring assembly along the length of the lead screw;
   a lead screw gear train located near the first ends of the variable diameter cylinders and configured to rotate the lead screw upon rotation of the lead screw gear train;
   a lead screw gear rack residing above the lead screw gear train and in toothed engagement therewith;
   a cylinder gear train located near the second ends of the variable diameter cylinders and configured to rotate a first one of the variable diameter cylinders upon rotation of the cylinder gear train;
   a cylinder gear rack residing above the cylinder gear train and in toothed engagement therewith;
   a pulley attached to the first end of each variable diameter cylinder, and a belt coupling one pulley to the other;
   a top plate residing above the lead screw gear rack and the cylinder gear rack and connected to both, the top plate constrained to linear movement in a direction substantially perpendicular to the longitudinal axes of the variable diameter cylinders; and
   a cable coupled to a first one of the constant force springs and extending to and winding partially around a first one of the variable diameter cylinders in a helical fashion, and a cable coupled to a second one of the constant force springs and extending to and winding partially around a second one of the variable diameter cylinders in a helical fashion;
   wherein, linear movement of the top plate upon application of a sufficient force thereto will be resisted by a restoring force that varies optimally with the displacement of the top plate.

2. The device of claim 1, wherein each variable diameter cylinder includes, along the length thereof, a constant diameter portion and a variable diameter portion.

3. The device of claim 2, wherein the variable diameter cylinders are arranged such that the constant diameter portion of one variable diameter cylinder is across from the variable diameter portion of the other variable diameter cylinder, and the points of transition between a constant diameter and a variable diameter on both cylinders are aligned.

4. The device of claim 1, wherein an outer surface of each variable diameter cylinder includes a helical groove that spans substantially the length of the variable diameter cylinder, and the portions of the cables wound around the cylinders reside in the helical grooves.

5. The device of claim 1, wherein the cables are wound around the variable diameter cylinders starting from aligned ends thereof.

6. The device of claim 1, wherein the pulleys are of like diameter, such that the ratio of the angular displacements between the variable diameter cylinders will be 1:1 when the variable diameter cylinders are caused to be rotated by linear displacement of the top plate.

7. The device of claim 1, wherein the lead screw, the lead screw gear train and the constant force spring assembly are collectively configured to maintain a longitudinal axis of each cable at a substantially perpendicular angle to the longitudinal axis of the variable diameter cylinder around which the cable is wound.

8. The device of claim 1, wherein linear movement of the top plate will result in:
a clockwise rotation of one of the variable diameter cylinders and a counterclockwise rotation of the other variable diameter cylinder; and
a winding/unwinding up the variable diameter portion of one of the variable diameter cylinders and a corresponding increase its resistive torque, and a winding/unwinding along a constant diameter portion of the other variable diameter cylinder with no change in its resistive torque.

9. The device of claim 1, wherein one of the cables is wound around its associated variable diameter cylinder in a clockwise direction and the other cable is wound around its corresponding variable diameter cylinder in a counterclockwise direction.

10. The device of claim 1, wherein the lead screw gear train and the cylinder gear train cooperatively control the rotation of the variable diameter cylinders relative to rotation of the lead screw, which in turn controls the position of the constant force springs relative to the position of the cables that extend therefrom and are wound around the variable diameter cylinders.

11. The device of claim 1, wherein the lead screw gear train and the cylinder gear train cooperatively amplify the resistive restoring force that is imparted to the top plate.

12. The device of claim 1, wherein the resistive force exerted on the top plate by the device as a function of the displacement of the top plate is represented by the equation:

$$F_{plate} = \frac{f \cdot F_s}{r_{pin}} \cdot \left[ (r_1 - r_2) + \left( \sum_1^i (m_1^{i-1} - m_2^{i-1}) \cdot L^{i-1} \right) + \left( \frac{L}{2} - \sum_1^i L^{i-1} \right) \cdot (m_1^i - m_2^i) \right] + \frac{f^2 \cdot F_s \cdot l}{2 \cdot \pi \cdot r_{pin}^2} \cdot (m_1^i - m_2^i) \cdot x_{plate}$$

13. The device of claim 12, wherein the following transformation was used to relate the position of the cable in a helical groove in the associated variable diameter cylinder and the position of the helical groove along the length of the variable diameter cylinder:

$$z = u_{cable} + \frac{L}{2}$$

where the position of the cable in the helical groove is related to the position of the top plate by the equation:

$$u_{cable} = \frac{f \cdot l}{2 \cdot \pi \cdot r_{pin}} x_{plate}$$

14. A passive variable stiffness device, comprising:
a base plate;
two cylinder pairs, each cylinder pair comprising a variable diameter cylinder having a helical groove encircling its circumference and a constant diameter cylinder having a variable lead helical groove encircling its circumference, the variable diameter cylinders and the constant diameter cylinders arranged in parallel and mounted to the base plate with the variable diameter cylinders located between the constant diameter cylinders, each of said cylinders restrained against linear movement and constrained to allow rotation only about its longitudinal axis;
a top plate residing above the cylinder pairs and constrained to linear movement in a direction substantially perpendicular to the longitudinal axes of the cylinder pairs;
a rack-and-pinion assembly connecting each variable diameter cylinder to the top plate;
a constant force spring attached to a like end of each constant diameter cylinder;
a cable coupled to a first one of the constant force springs, the cable wound around half of and in the helical groove of the constant diameter cylinder to which the spring is attached and also wound around half and in the helical groove of the variable diameter cylinder that is paired with the constant diameter cylinder to which the spring is attached, starting from opposite ends of the cylinders;
a cable coupled to the second constant force spring, the cable wound around half of and in the helical groove of the constant diameter cylinder to which the second spring is attached and also wound around half of and in the helical groove of the variable diameter cylinder that is paired with the constant diameter cylinder to which the second spring is attached, starting from opposite ends of the cylinders;
wherein, linear movement of the top plate upon application of a sufficient force thereto will be resisted by a restoring force that varies optimally with the displacement of the top plate.

15. The device of claim 14, wherein:
each variable diameter cylinder includes, along the length thereof, a constant diameter portion and a variable diameter portion; and
the variable diameter cylinders are arranged such that the constant diameter portion of one variable diameter cylinder is across from the variable diameter portion of the other variable diameter cylinder, and the points of transition between a constant diameter and a variable diameter on both cylinders are aligned.

16. The device of claim 14, wherein one of the cables is wound around its associated variable diameter cylinder in a clockwise direction and the other cable is wound around its corresponding variable diameter cylinder in a counterclockwise direction.

17. The device of claim 14, wherein linear movement of the top plate will result in:
- a clockwise rotation of one of the variable diameter cylinders and a counterclockwise rotation of the other variable diameter cylinder; and
- a winding/unwinding up the variable diameter portion of one of the variable diameter cylinders and a corresponding increase its resistive torque, and a winding/unwinding along a constant diameter portion of the other variable diameter cylinder with no change in its resistive torque.

18. The device of claim 14, wherein the variable diameter cylinders and the constant diameter cylinders are constrained by the cables to have the same circumferential displacement and velocity when caused to be rotated by a linear displacement of the top plate.

19. The device of claim 14, wherein:
- in locations where the diameter of the constant diameter cylinder of a given cylinder pair is smaller than the diameter of the corresponding variable diameter cylinder, the helical groove on the constant diameter cylinder has a shorter lead than the helical groove in the corresponding variable diameter cylinder; and
- in locations where the diameter of the constant diameter cylinder of a given cylinder pair is larger than the diameter of the corresponding variable diameter cylinder, the helical groove on the constant diameter cylinder has a longer lead than the helical groove in the corresponding variable diameter cylinder.

* * * * *

UNITED STATES PATENT AND TRADEMARK OFFICE
CERTIFICATE OF CORRECTION

PATENT NO. : 11,434,973 B2  
APPLICATION NO. : 17/601945  
DATED : September 6, 2022  
INVENTOR(S) : Kenneth K. Walsh Page 1 of 1

It is certified that error appears in the above-identified patent and that said Letters Patent is hereby corrected as shown below:

In the Specification

Column 8, Line 23, please remove "$1_{1.2}$" and insert -- $l_{1,2}$ --

Column 8, Line 62, please remove "($1_1 = 1_2 = 1$)" and insert -- ( $l_1 = l_2 = l$ ) --

Signed and Sealed this  
First Day of November, 2022

Katherine Kelly Vidal  
*Director of the United States Patent and Trademark Office*